United States Patent
Chesneau

(10) Patent No.: US 12,504,979 B2
(45) Date of Patent: Dec. 23, 2025

(54) ASYNCHRONOUS STATE MACHINE FOR A SWITCHING CONVERTER

(71) Applicant: STMicroelectronics International N.V., Geneva (CH)

(72) Inventor: David Chesneau, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 71 days.

(21) Appl. No.: 18/597,564

(22) Filed: Mar. 6, 2024

(65) Prior Publication Data

US 2024/0303092 A1    Sep. 12, 2024

(51) Int. Cl.
G06F 9/448    (2018.01)
G06F 9/38     (2018.01)

(52) U.S. Cl.
CPC .......... *G06F 9/4498* (2018.02); *G06F 9/3871* (2013.01)

(58) Field of Classification Search
None
See application file for complete search history.

(56) References Cited

U.S. PATENT DOCUMENTS

| 7,426,650 | B2 | 9/2008 | Grass et al. | |
| 2015/0229215 | A1* | 8/2015 | Choudhary | H02M 3/1582 |
| | | | | 323/271 |
| 2016/0254746 | A1* | 9/2016 | Lerdworatawee | H02M 3/07 |
| | | | | 323/271 |
| 2018/0166990 | A1* | 6/2018 | Gibson | H02M 3/158 |
| 2020/0169174 | A1 | 5/2020 | Wachi et al. | |

FOREIGN PATENT DOCUMENTS

EP    3499699 A1    6/2019

OTHER PUBLICATIONS

INPI Search Report and Written Opinion for priority application, FR Appl. No. 2302253, report dated Aug. 22, 2023, 8 pgs.

* cited by examiner

*Primary Examiner* — Anh Q Tran
(74) *Attorney, Agent, or Firm* — Crowe & Dunlevy LLC

(57) ABSTRACT

An asynchronous finite state machine has states coupled by transitions each implemented by a flip-flop. Each flip-flop supplies a bit of a state of arrival of the corresponding transition, and receives a bit of an initial state of this transition on its data input and a first signal dedicated to the flip-flop on its control input. A circuit supplies, for each transition, a second signal of request for the transition. Another circuit generates based on the second signals, at each request for a transition and in the absence of a pulse of the first signals, a pulse of the first signal dedicated to the flip-flop of this transition, and a pulse of the first signal dedicated to each flip-flop supplying a bit to the flip-flop of the transition.

22 Claims, 3 Drawing Sheets

ASYNCHRONOUS STATE MACHINE FOR A SWITCHING CONVERTER

PRIORITY CLAIM

This application claims the priority benefit of French Application for U.S. Pat. No. 2,302,253, filed on Mar. 10, 2023, the content of which is hereby incorporated by reference in its entirety to the maximum extent allowable by law.

TECHNICAL FIELD

The present disclosure generally concerns electronic circuits and, in particular, a finite state machine (FSM) for a switching converter, that is, a finite state machine for supplying control signals to cut-off switches of a switching converter.

BACKGROUND

Switching converters are circuits used in a large number of applications to convert an input voltage of the converter, for example a Direct Current (DC) voltage, into an output voltage of the converter, for example a DC output voltage, having a value determined by a set point.

FIG. 1 very schematically illustrates an example of such a switching converter 1.

Converter 1 comprises a high-side switch HSS, and a low-side switch LSS.

Switch HSS couples a node 100 of converter 1 to a connection (or switching) node 102 of converter 1. Node 100 is configured to receive a power supply potential VDD.

Switch LSS couples a node 104 of converter 1 to node 102. Node 104 is configured to receive a reference potential, for example the ground GND potential.

The potential VDD referenced to reference potential GND corresponds to the input or power supply voltage of the converter 1.

Converter 1 further comprises an inductor L. Inductor L couples node 102 to an output OUT of converter 1. An output voltage Vout is available on the output OUT of converter 1.

As an example, each switch HSS, LSS is implemented by one or a plurality of MOS transistors.

To control cut-off switches HSS and LSS, the converter comprises a finite state machine FSM, or, in other words, a circuit FSM implementing a finite state machine. Circuit FSM is configured to control each of switches HSS and LSS to the on and off states.

More particularly, state machine FSM is configured to supply a first binary signal cmdH having a first binary state controlling switch HSS to the off state and a second binary state controlling this switch HSS the on state. Similarly, state machine FSM is configured to supply a second binary signal cmdL having a first binary state controlling switch LSS to the off state and a second binary state controlling this switch LSS the on state.

As an example, signal cmdH is supplied to a control terminal of switch HSS, for example to the gate of the MOS transistor(s) implementing this switch, either directly, or via a driver circuit DriverH. As an example, signal cmdL is supplied to a control terminal of switch LSS, for example to the gate of the MOS transistor(s) implementing this switch, either directly, or via a driver circuit DriverL.

The binary states of signals cmdH and cmdL are determined by the current state of state machine FSM.

State machine FSM comprises a plurality of states coupled together by transitions. To determine whether state machine FSM should or should not implement a transition between two states, for example between the current state of state machine FSM and a next state of state machine FSM, circuit FSM receives input signals sig-in. Signals sig-in indicate whether conditions on signals of converter 1 are verified or not. As an example, signals sig-in indicate whether the current flowing in inductor L has a zero value or not, whether output voltage Vout is greater or smaller than at least one threshold, etc.

Usually, when circuit FSM is implemented synchronously, that is, when the current state of state machine FSM and the outputs cmdH and cmdL of state machine FSM are updated at the frequency of a periodic clock signal, circuit FSM comprises: a state register having an output indicating the current state of state machine FSM and an input receiving an indication of the next state of state machine FSM; and a combinational circuit taking as inputs signals sig-in and the output of the state register, and supplying the indication of the next state of the state machine.

In this case, the state register of state machine FSM is updated at each cycle of the periodic clock signal.

As an example, outputs cmdH and cmdL are, for example, determined based on the indication of the current state of state machine FSM, that is, based on the output of the state register. As an alternative example, circuit FSM further comprises: an output register supplying outputs cmdH and cmdL and an input receiving an indication of the next value of outputs cmdH and cmdL; and a combinational circuit receiving the indication of the current state of state machine FSM and signals sig-in, and supplying the indication of the next value of outputs cmdH and cmdL.

In this alternative example, the output register and the state register are simultaneously updated, at each cycle of the periodic clock signal.

However, a disadvantage of a synchronous implementation of circuit FSM is that the frequency of the periodic clock signal has to be much greater than the switching or control frequency of switches LSS and HSS, for example at least 100 times greater, to regulate in sufficiently accurate fashion the value of voltage Vout. This poses various problems. For example, this makes converter 1 poorly adapted to applications where the power consumption is desired to be minimized.

To overcome the disadvantages of finite state machines implemented synchronously, it has been provided to implement purely asynchronous finite state machines, that is, with no clock signal. These purely asynchronous state machines are then implemented by means of dedicated electronic components, such as for example Muller cells.

However, the design of a purely asynchronous state machine requires specific development tools, which are generally not compatible with tools for developing digital circuits rated by a periodic clock signal. Further, a purely asynchronous state machine is generally not compatible with digital circuits rated by a periodic clock signal.

To overcome the disadvantages inherent to finite state machines implemented synchronously and to purely asynchronous finite state machines, it has also been provided to implement Globally Asynchronous-Locally Synchronous (GALS) state machines.

GALS-type state machines are implemented similarly to the purely synchronous state machines of the alternative example described hereabove, with the difference that: a GALS-type state machine comprises no periodic clock signal controlling the updates of its state and output registers;

a GALS-type state machine comprises a circuit for storing its input signals, the signals thus stored being supplied to the combinational circuits providing the indication of the next state of the state machine and the indication of the next value of the outputs of the state machine; and a GALS-type state machine comprises a local clock generation circuit configured to supply a local clock signal based on the indication of the next state of the state machine and on the indication of the current state of the state machine, the local clock signal controlling a storage of the input signals of the state machine and, simultaneously, updates of the state and output registers, only when this is useful, whereby the local clock signal is not periodic.

In a GALS-type state machine, the registers and the storage circuits are implemented with usual synchronous components such as for example flip-flops or latches.

However, a GALS-type state machine is generally slow since the maximum frequency that the local clock signal can reach is limited by metastability resolution times in the input signal storage circuit and by the time of calculation of the indication of the next state of the state machine.

There exists a need to overcome all or part of the disadvantages of known finite state machines for switching converters.

SUMMARY

An embodiment provides an asynchronous finite state machine which is not implemented with dedicated asynchronous components and/or by using dedicated asynchronous development tools.

For example, an embodiment provides an asynchronous finite state machine comprising no state register, and thus no combinational circuit providing an indication of the next state of the state machine. This, for example, enables the asynchronous state machine to operate more rapidly than a GALS-type state machine or an asynchronous state machine implemented with dedicated asynchronous components.

For example, an embodiment provides an asynchronous finite state machine having a decreased power consumption as compared with a synchronous state machine.

An embodiment provides an asynchronous finite state machine for controlling high-side and low-side switches of a switching converter, wherein: the state machine comprises a plurality of states connected together by transitions, each transition being implemented by a D flip-flop; each flip-flop has an output configured to supply a bit representative of a state of the state machine, said state being a state of arrival of the transition implemented by the flip-flop, a data input configured to receive a bit representative of an initial state of the transition implemented by the flip-flop and a control input configured to receive a first binary pulse signal dedicated to said flip-flop; a first combinational circuit is configured to supply, based on input signals of the state machine and on the bits supplied by the outputs of the flip-flops, and for each transition, a second binary signal corresponding to said transition and indicating whether an implementation of said transition is required or not; and a second circuit is configured to generate based on the second signals, at each request of implementation of a transition and in the absence of a pulse of the first signals, a pulse of the first signal dedicated to the flip-flop implementing said transition, and a pulse of the first signal dedicated to each flip-flop having its output configured to supply a bit to the data input of the flip-flop implementing said transition.

According to an embodiment, each flip-flop is configured so that a beginning of each pulse of the first signal dedicated to said flip-flop causes an update of said flip-flop.

According to an embodiment, the second circuit is configured to generate, at each request of implementation of a transition and in the absence of a pulse of the first signals, only the pulse of the first signal dedicated to the flip-flop implementing said transition and the pulse of the first signal dedicated to each flip-flop having its output configured to supply un bit to the data input of the flip-flop implementing said transition.

According to an embodiment, the first combinational circuit comprises no state register and circuit for storing the input signals of the state machine.

According to an embodiment, the state machine comprises: at least one pair of transitions having a same initial state; and for each pair of transitions having a same initial state, the first combinational circuit comprises a mutual exclusion circuit configured, based on a plurality of said input signals of the state machine, to supply the second binary signal indicating whether an implementation of a first transition of the pair of transitions is required or not and the second binary signal indicating whether an implementation of a second transition of the pair of transitions is required or not, so that only one among these two second signals indicates that the transition corresponding to this second signal is required.

According to an embodiment, the second circuit comprises: for each transition, a pulse generator associated with said transition and configured to: receive the second signal corresponding to said transition, and generate, at each request of implementation of said transition and in the absence of a pulse of the first signals, an output pulse; and a third combinational circuit configured to deliver said first signals based on the output pulses of the generators.

According to an embodiment, the third combinational circuit is further configured to supply a binary signal at a first level only if at least one of the first signals exhibits a pulse and at a second level otherwise, each pulse generator being configured to deliver no output pulse if said binary signal is at the first level.

According to an embodiment, each pulse generator is configured, at each output pulse delivered by the pulse generator, so that a switching of the output of the flip-flop implementing the transition with which the generator is associated and/or a switching of the data input of the flip-flop implementing the transition with which the generator is associated ends said output pulse.

According to an embodiment, the second circuit is configured so that each pulse of the first signals has a same constant duration determined by a hold time of said flip-flops.

According to an embodiment, the second circuit is configured so that, at each request of implementation of a transition for which the second circuit generates a pulse of the first signal dedicated to the flip-flop implementing the transition and a pulse of the first signal dedicated to each flip-flop having its output configured to supply a bit to the data input of the flip-flop implementing said transition, a switching of the output of the flip-flop implementing the transition and/or a switching of the data input of the flip-flop implementing the transition ends said pulses According to an embodiment, the state machine is configured to implement: a first phase controlling a high-side switch of a switching converter to the on state and a low-side switch of the converter to the off state; a second phase controlling the low-side, respectively high-side, switch to the on, respectively off, state; and a third phase controlling both switches to the off state, and, for each state, the state machine is configured to implement one of said first, second, and third phase.

According to an embodiment, the state machine is configured to control the converter alternately in continuous conduction mode and in discontinuous conduction mode, the continuous conduction mode comprising one or a plurality of implementations of a succession of the second, third, and first phases, and the continuous conduction mode comprising one or a plurality of implementations of the succession of the second and first phases.

According to an embodiment, the flip-flops comprise exactly a first flip-flop, a second flip-flop, a third flip-flop, and a fourth flip-flop configured so that: the data input of the first flip-flop receives the bit supplied by the output of the second flip-flop and the bit supplied by the output of the third flip-flop; the data inputs of the third and fourth flip-flops each receive the bit supplied by the output of the first flip-flop; and the data input of the second flip-flop receives the bit supplied by the output of the fourth flip-flop.

According to an embodiment: the bit supplied by the output of the second flip-flop and the bit supplied by the output of the third flip-flop are representative of a first state of the state machine; the bit supplied by the output of the first flip-flop is representative of a second state of the state machine; the bit supplied by the output of the fourth flip-flop is representative of a third state of the state machine; and the state machine is configured to implement the first, second, and third phase in the first, second, and third states respectively.

An embodiment provides a switching converter comprising: a high-side switch coupling a connection node to a node configured to receive a power supply potential; a low-side switch coupling the connection node to a node configured to receive a reference potential; an inductor coupling the connection node to an output of the converter; and a state machine such as described hereabove.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Figure 1:
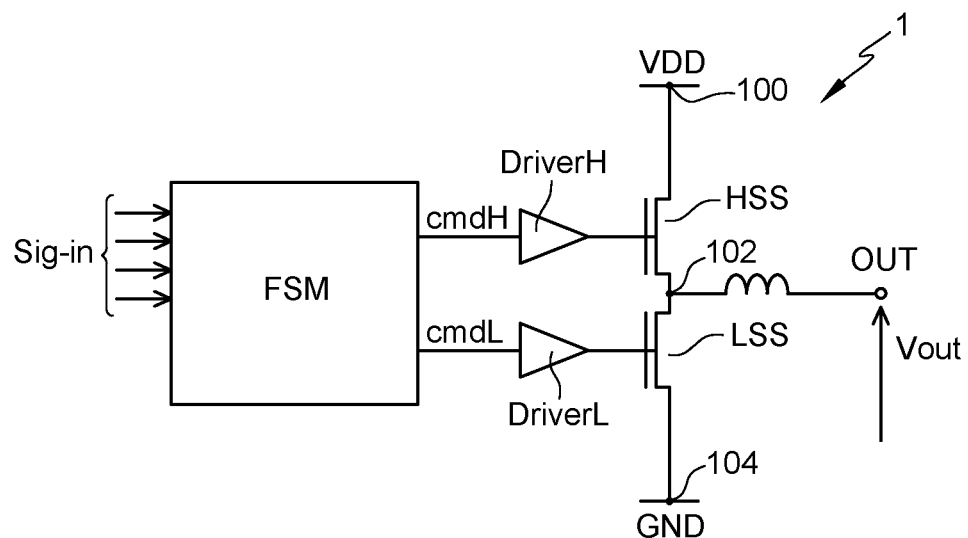
FIG. 1, previously described, shows an example of a switching converter comprising a finite state machine for controlling the high-side and low-side switches of the converter.

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail. In particular, the various usual applications where a switching converter is implemented and comprises a state machine to control its cut-off switches have not been described, the described embodiments and variants being compatible with these usual applications.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

There is here provided an asynchronous finite state machine implemented based on D flip-flops, in which each transition between two states of the state machine is implemented by, or correspond to, a D flip-flop.

Each D flip-flop supplies a bit representative of, or corresponding to, a state of the state machine, where a plurality of bits may correspond to a same state. For example, the bit supplied by a flip-flop corresponding to a transition between two states of the state machine is representative of the state of arrival of this transition. For example, if a bit corresponding to a given state of the state machine is active, this signifies that the current state of the state machine is this given state.

Each D flip-flop has a data input receiving a bit representative of the initial state of the transition, this bit thus being an output bit of another D flip-flop of the state machine.

According to an embodiment where the state machine comprises a first transition having its initial state which corresponds to the state of arrival of two other transitions, the flip-flop implementing this first transition receives on its data input the output bit of the flip-flop corresponding to one of the two transitions and the output bit of the flip-flop corresponding to the other of the two transitions, or, in other words, a combination of these two bits. More particularly, the two output bits of the two flip-flops corresponding to said two transitions are supplied to the data input of the flip-flop corresponding to the first transition so that if one of the two bits is in the active state to indicate the current state of the state machine, the input of the flip-flop corresponding to the first transition is in the active state.

Further, to control an implementation of a transition between two states, the state machine comprises a circuit configured to deliver, to each flip-flop, a pulse signal for controlling this flip-flop. When a transition between two states is required, or, in other words, when the conditions for the implementation of the transition are verified, and provided for none of the control signals to already exhibit a pulse, this circuit generates a pulse of the signal for controlling the flip-flop implementing the transition, so that the flip-flop updates its output based on its data input, for example at the time of the first edge of the pulse. Further, this circuit also, and simultaneously, generates a pulse of the signal for controlling each D flip-flop having its output bit supplied at the input of the D flip-flop implementing this transition.

For each transition, the indication that a transition is required or not is indicated by a corresponding output signal of a combinational circuit of the state machine. This combinational circuit delivers its output signals based on, preferably only, the input signals of the state machine and on the output bits of the flip-flops implementing the transitions of the state machine. Indeed, for a transition to be implemented, it must be ascertained for the state machine to effectively be in an initial state of this transition.

The provided state machine is thus implemented based on usual components of synchronous circuits, and particularly based on synchronous D flip-flops, without using dedicated asynchronous components.

The provided state machine is also faster than an equivalent finite GALS-type state machine where the computing of the next state takes time, while this computing is not implemented in the provided state machine.

Further, the provided state machine only generates a switching when this is necessary, which decreases its power consumption with respect to a synchronous state machine. In particular, during the implementation of a transition between two states, the state machine does not deliver a pulse to each of the control signals of the flip-flops, but only to the control signals of certain flip-flops.

Further, the provided state machine does not require storing its input signals, conversely to a GALS-type state machine. This enables the provided state machine to be faster due to the fact that it is not necessary to provide, as is the case in a GALS-type state machine, a metastability resolution time for each storage of the input signals of the state machine.

According to an embodiment, the provided finite state machine comprises a pair of transitions having a same initial state. In such an embodiment, the combinational circuit delivering the signal indicating whether an implementation of a first transition of the pair of transitions is required or not and the signal indicating whether an implementation of a second transition of the pair of transitions is required or not then comprises a mutual exclusion circuit. The mutual exclusion circuit is configured to supply these two signals, so that only one among these two signals indicates that the transition corresponding thereto is required. This enables to avoid for the circuit generating the control signals of the flip-flops to control a simultaneous implementation of these two transitions.

Figure 2:
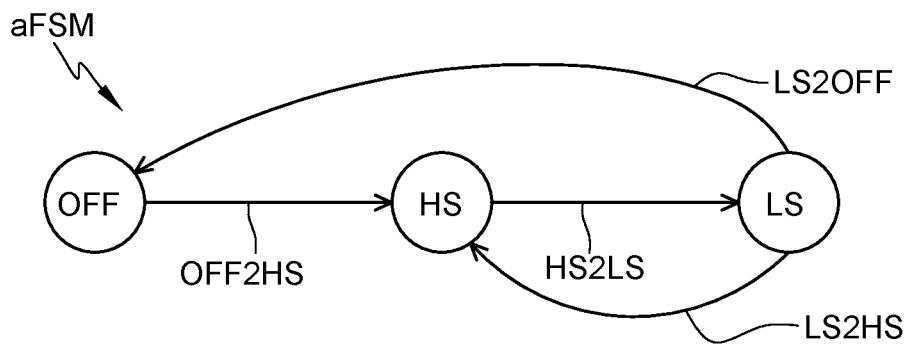
FIG. 2 shows, in the form of a state diagram, an example of embodiment of an asynchronous finite state machine for a switching converter.

FIG. 2 shows, in the form of a state diagram, an example of embodiment of an asynchronous finite state machine aFSM for a switching converter, for example for the converter 1 of FIG. 1.

According to an embodiment, the asynchronous finite state machines aFSM provided herein are implemented based on three states OFF, HS, and LS, preferably only based on these three states OFF, HS, and LS.

State HS correspond to a first control phase where the state machine controls switch HSS to the on state, and thus switch LSS to the off state. In other words, at state HSS, state machine aFSM is configured to implement the first control phase.

State LS corresponds to a second control phase where the state machine controls switch LSS to the on state, and thus switch HSS to the off state. In other words, at state LSS, state machine aFSM is configured to implement the second control phase.

State OFF corresponds to a third control phase where the state machine controls the switches HSS and LSS of converter 1 to the off state. In other words, at state OFF, state machine aFSM is configured to implement the third control phase.

Thus, for each of its states, state machine aFSM implements one of the first, second, and third control phase.

According to an embodiment, as illustrated in FIG. 2, state machine aFSM comprises these three states OFF, HS, and LS.

According to an embodiment, as is the case in the example of FIG. 2, state machine aFSM is configured to control converter 1, that is, the switches HSS and LSS of converter 1, alternatively according to a continuous conduction mode (CCM) and a discontinuous conduction mode (DCM).

In the continuous conduction mode, state machine aFSM is configured to alternate two control phases, that is, the first and second control phases as previously-described. In other words, state machine aFSM controls the converter by implementing one or a plurality of successions, preferably in this order, of the first and second control phases as noted above.

In the discontinuous conduction mode, state machine aFSM is configured to alternate three control phases, that is, the first, second, and third control phases as previously-described. In other words, state machine aFSM controls the converter by implementing one or a plurality of successions, preferably in this order, of the first, second, and third control phases as noted above.

In the state machine aFSM of the example of FIG. 2, states OFF, HS, and LS are coupled together by transitions OFF2HS, HS2LS, LS2HS, and LS2OFF, each transition coupling two states, that is, an initial state of the transition and a state of arrival of the transition.

More particularly, in the example of FIG. 2, transition OFF2HS couples state OFF to state HS, state OFF corresponding to the initial state, and state HS, corresponding to the state of arrival, of transition OFF2HS. Transition HS2LS couples state HS to state LS, state HS corresponding to the initial state, and state LS corresponding to the state of arrival, of transition HS2LS. Transition LS2HS couples state LS to state HS, state LS corresponding to the initial state, and state HS corresponding to the state of arrival, of transition LS2HS. Transition LS2OFF couples state LS to state OFF, state LS corresponding to the initial state, and state OFF corresponding to the state of arrival, of transition LS2OFF.

When state machine aFSM implements one or a plurality of successions of transitions HS2LS, LS2OFF, and OFF2HS, state machine aFSM then implements one or a plurality of successions of states HS, LS, and OFF, that is, one or a plurality of successions of the first, second, and third control phase described hereabove. State machine aFSM then controls the converter in discontinuous conduction mode.

When state machine aFSM implements one or a plurality of successions of transitions HS2LS and LS2HS, state machine aFSM then implements one or a plurality of successions of states HS and LS, that is, one or a plurality of successions of the first and second control phases described hereabove. State machine aFSM then controls the converter in continuous conduction mode.

In practice, a transition is implemented by state machine aFSM when the current state of state machine aFSM is the initial state of the transition, and the input signals of state machine aFSM indicate that the implementation of this transition is required, or, in other words, indicate that the conditions for the implementation of the transition are verified.

In the example of FIG. 2, the selection of the control of converter 1 by state machine aFSM according to the continuous conduction mode or the discontinuous conduction mode is determined by that of transitions LS2OFF and LS2HS which is implemented when the current state of the state machine is state LS. Indeed, if transition LS2OFF is implemented while transition LS2HS is not, state machine aFSM then controls the converter in discontinuous mode, at least until its current state is state LS again. Conversely, if transition LS2HS is implemented while transition LS2OFF is not, state machine aFSM then controls the converter in continuous mode, at least until its current state is state LS again.

According to an embodiment, when state machine aFSM comprises two transitions having a same initial state, as is the case for transitions LS2OFF and LS2HS in the example of FIG. 2 where these two transitions have the same initial state LS, there is provided a mutual exclusion function and/or circuit configured so that only one of these two transitions can effectively be implemented, that is, to prevent for the two transitions to be implemented simultaneously. For example, state machine aFSM is implemented by a circuit aFSM comprising a combinational circuit delivering signals, each indicating, for a corresponding transition, whether the implementation of the transition is required or not, or, in other words, whether the conditions of the transition are verified. In this case, the combinational circuit comprises a mutual exclusion circuit to deliver the signal indicating whether an implementation of transition LS2HS is required or not and the signal indicating whether an implementation of transition LS2OFF is required or not, so that only one among these two signals indicates that the implementation of the corresponding transition is required.

Although there has been described herein a specific example of an asynchronous finite state machine aFSM, those skilled in the art will be capable of providing other state machines implemented with at least two of the three states HS, LS, and OFF, preferably with the three states HS, LS, and OFF, comprising, for example, transitions different from those described in relation with FIG. 2.

Figure 3:
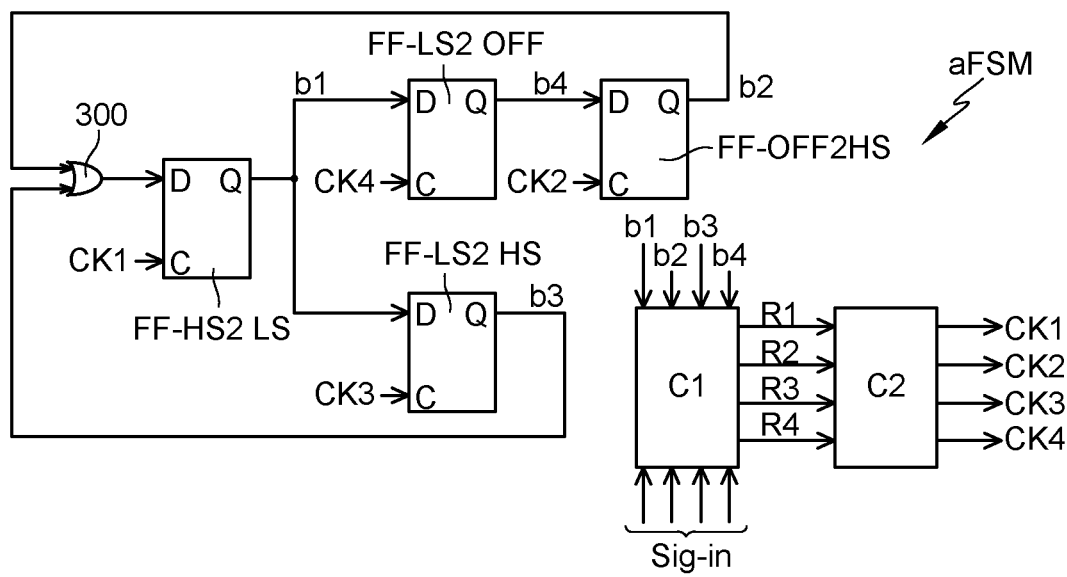
FIG. 3 shows, in the form of a circuit, an example of embodiment of an asynchronous finite state machine for a switching converter.

FIG. 3 shows, in the form of a circuit, an example of embodiment of an asynchronous finite state machine for a switching converter. More particularly, FIG. 3 shows an example of embodiment of a circuit aFSM corresponding to the state machine aFSM of FIG. 2, circuit aFSM being for example used to control the converter 1 of FIG. 1.

As previously indicated, each transition of state machine aFSM (FIG. 2) is implemented, in the corresponding circuit aFSM, by a D flip-flop. Thus, circuit aFSM comprises, in the example of FIG. 3, a flip-flop FF-OFF2HS implementing transition OFF2HS, a flip-flop FF-HS2LS implementing transition HS2LS, a flip-flop FF-LS2HS implementing transition LS2HS, and a flip-flop FF-LS2OFF implementing transition LS2OFF.

Each flip-flop comprises a data input D, a control (or synchronization) input C, and an output Q. The operation of a synchronous D flip-flop is well known and is not detailed again herein.

Flip-flop FF-HS2LS supplies a bit b1, flip-flop FF-OFF2HS supplies a bit b2, flip-flop FF-LS2HS supplies a bit b3, and flip-flop FF-LS2OFF supplies a bit b4.

The state of arrival of transition HS2LS being state LS (FIG. 2), the output bit b1 of flip-flop FF-HS2LS corresponding to this transition is thus representative of the state HS of arrival of this transition.

Similarly, the state of arrival of transition HS2LS being state LS (FIG. 2), the output bit b4 of flip-flop FF-LS2OFF corresponding to this transition is thus representative of the state OFF of arrival of this transition.

Further, the state of arrival of transition OFF2HS and of transition LS2HS being the same state HS (FIG. 2), the output bits b2 and b3 of respective flip-flops FF-OFF2HS and FF-LS2HS corresponding to these two transitions are thus each representative of the state HS of arrival of these two transitions.

Thus, it is sufficient for one of bits b2 and b3 to be active and to indicate that the state corresponding to this bit is the current state of state machine aFSM for the current state of the state machine to be state HS. In other words, state HS corresponds to a combination of bits b2 and b3, for example to a bit determined by the combination of bits b2 and b3.

Further, since state HS is the initial state of the transition HS2LS corresponding to flip-flop FF-HS2LS, the data input D of flip-flop FF-HS2LS receives the two bits b2 and b3. More particularly, the D input of flip-flop FF-HS2LS receives a bit having its active or inactive state determined by the state of each of bits b2 and b2, so that the bit received by the D input of flip-flop FF-HS2LS is in the active state as soon as one of bits b2 and b3 is in the active state. In other words, flip-flop FF-HS2LS receives a bit determined by a combination of bits b2 and b3. As an example, when the active state of bits b2 and b3 corresponds to a high level, the D input of flip-flop FF-HS2LS receives a bit corresponding to the output of a logic gate 300 implementing an OR logic function between the bits b2 and b3 that it receives on its inputs. Those skilled in the art will be capable of modifying the logic function implemented by gate 300 when the active state of one and/or the other of bits b2 and b3 corresponds to a low level.

The C control input of flip-flop FF-HS2LS receives a control signal CK1 dedicated to flip-flop FF-HS2LS, the C input of flip-flops FF-LS2OFF, FF-LS2HS, and FF-OFF2HS receiving respective control signals CK2, CK3, and CK4 dedicated to the respective flip-flops FF-LS2OFF, FF-LS2HS, and FF-OFF2HS. Control signals CK1, CK2, CK3, and CK4 are binary pulse signals, that is, binary signals exhibiting pulses.

As an example, for each of signals CK1, CK2, CK3, and CK4, a pulse of the signal corresponds to a switching from the low state of the signal to its high state, followed by a switching from the high state to the low state. The switching from the low state to the high state marks the beginning of the pulse, and that from the high state to the low state marks the end of the pulse. However, this may be the inverse in other examples.

The C inputs of flip-flops FF-HS2LS, FF-OFF2HS, FF-LS2HS, and FF-LS2OFF are responsive to the edges marking the beginnings of the pulses of respective signals CK1, CK2, CK3, and CK4, for example to the rising edges of these signals CK1, CK2, CK3, and CK4 when the pulses each correspond to a high state of the signal. In other words, when flip-flop FF-HS2LS, FF-OFF2HS, FF-LS2HS, and FF-LS2OFF, receives a pulse of the signal, respectively CK1, CK2, CK3, or CK4, the beginning of the pulse causes the update of the flip-flop, that is, the flip-flop updates its output based on its data input and maintains the state of its output until the next update of the flip-flop.

Circuit aFSM further comprises a combinational circuit C1. Circuit C1 receives the input signals sig-in of state machine aFSM and the bits b1 to b4 of the outputs of the flip-flops implementing the transitions of state machine aFSM. Circuit C1 is configured to supply, only based on input signals sig-in and on bits b1 to b4, and for each transition (and thus each flip-flop), a binary signal indicating whether an implementation of the transition is required or not. For example, for each transition, the corresponding binary signal delivered by circuit C1 is at a first level if an implementation of the transition is required, and at a second level otherwise. An advantage of circuit C1 is that it comprises no state register and circuit for storing the input signals sig-in of the state machine.

More particularly, in the example of FIG. 3, circuit C1 supplies signals R1, R2, R3, and R4 indicating for each of the respective transitions HS2LS, OFF2HS, LS2HS, and LS2OFF whether an implementation of the transition is required or not.

According to an embodiment where two transitions have a same initial state, as is the case in the example of FIG. 3 where the two transitions implemented by flip-flops FF-LS2OFF and FF-LS2HS have the same initial state HS represented by bit b1, circuit C1 is configured so that only one among the signal R3 indicating whether an implementation of transition LS2HS is required or not and the signal R4 indicating whether an implementation of transition LS2HS is required or not can effectively indicate that an implementation of the transition corresponding to this signal is required. As an example, circuit C1 then implements a function of mutual exclusion between signals R3 and R4, for example by means of a mutual exclusion circuit.

Although this has been illustrated for transitions LS2OFF and LS2HS, which have the same initial state HS, this remains true for any assembly of at least two transitions having a same initial state.

Circuit aFSM further comprises a circuit C2. Circuit C2 receives output signals R1, R2, R3, and R4 of circuit C1. Circuit C2 is configured to generate, based on signals R1, R2, R3, and R4, signals CK1, CK2, CK3, and CK4. More particularly, at each request of implementation of a transition and in the absence of a pulse of signals CK1, CK2, CK3, and CK4, that is, when none of signals CK1, CK2, CK3, and CK4 exhibits a pulse, circuit C2 is configured to generate a pulse of the signal CK1, CK2, CK3, or CK4 dedicated to the flip-flop implementing the transition, and, further, a pulse of the signal CK1, CK2, CK3, or CK4 dedicated to each flip-flop having its output supplying a bit to the data input of the flip-flop implementing this transition.

For example, as an illustration, when signal R1 indicates that the implementation of transition HS2LS is required and none of signals CK1, CK2, CK3, and CK4 exhibits a pulse, circuit C2 is configured to generate a pulse of signal CK1 for controlling the flip-flop FF-HS2LS implementing transition HS2LS. In this example, circuit C2 is further configured to generate, simultaneously to the pulse of signal CK1, a pulse of signal CK2 and a pulse of signal CK3 due to the fact that the output bit b2 of flip-flop FF-OFF2HS and the output bit b3 of flip-flop FF-LS2HS are both supplied to the D input of the flip-flop FF-HS2LS implementing transition HS2LS.

According to an embodiment, at each request of implementation of a transition and in the absence of a pulse of signals CK1, CK2, CK3, and CK4, circuit C2 is more particularly configured to only generate a pulse of the signal CK1, CK2, CK3, or CK4 dedicated to the flip-flop implementing the transition, and a pulse of the signal CK1, CK2, CK3, or CK4 dedicated to each flip-flop having its output supplying a bit to the data input of the flip-flop implementing this transition. This enables to avoid, at each implementation of a transition, any useless switching of those of signals CK1, CK2, CK3, and CK4 which are not necessary to control flip-flops in order to implement the transition.

According to an embodiment, the duration of each pulse of each of signals CK1, CK2, CK3, and CK4 is fixed and constant. This pulse duration then is, preferably, determined by the hold times of the D flip-flops, for example so that the duration of the pulses is equal to or greater than this hold time.

According to an alternative embodiment, at each request of implementation of a transition, after having generated a pulse of the signal CK1, CK2, CK3, or CK4 dedicated to the flip-flop implementing the transition and, simultaneously, a pulse of the signal CK1, CK2, CK3, or CK4 dedicated to each flip-flop having its output supplying a bit to the D input of the flip-flop implementing this transition, circuit C2 is further configured so that a switching of the output of the flip-flop implementing the transition ends these pulses. Thereby, the generated pulses may be shorter than in the case where their duration is fixed. For example, as an illustration, when circuit C2 receives a signal R2 indicating that an implementation of transition OFF2HS is required, the circuit generates a pulse of signal CK2 and, simultaneously, a pulse of signal CK4, and, as soon as the output of flip-flop FF-OFF2HS switches, circuit C2 ends these pulses.

According to another alternative embodiment, at each request of implementation of a transition, after having generated a pulse of the signal CK1, CK2, CK3, or CK4 dedicated to the flip-flop implementing the transition and, simultaneously, a pulse of the signal CK1, CK2, CK3, or CK4 dedicated to each flip-flop having its output supplying a bit to the D input of the flip-flop implementing this transition, circuit C2 is further configured so that a switching of the input of the flip-flop implementing the transition ends these pulses. Thereby, the generated pulses may be shorter than in the case where their duration is fixed. For example, as an illustration, when circuit C2 receives a signal R2 indicating that an implementation of transition OFF2HS is required, the circuit generates a pulse of signal CK2 and, simultaneously, a pulse of signal CK4, and, as soon as the input bit b4 of flip-flop FF-OFF2HS switches, circuit C2 ends these pulses.

According to still another alterative embodiment, at each request of implementation of a transition, after having generated a pulse of the signal CK1, CK2, CK3, or CK4 dedicated to the flip-flop implementing the transition and, simultaneously, a pulse of the signal CK1, CK2, CK3, or CK4 dedicated to each flip-flop having its output supplying a bit to the D input of the flip-flop implementing this transition, circuit C2 is further configured so that a combination of a switching of the input of the flip-flop implementing the transition and of a switching of the output of this flip-flop ends these pulses. Thereby, the generated pulses may be shorter than in the case where their duration is fixed. For example, as an illustration, when circuit C2 receives a signal R2 indicating that an implementation of transition OFF2HS is required, the circuit generates a pulse of signal CK2 and, simultaneously, a pulse of signal CK4, and, as soon as the input bit b4 of flip-flop FF-OFF2HS and the output bit b2 of flip-flop FF-OFFHS have both switched, circuit C2 ends these pulses.

As compared with the above-described embodiments, the last above embodiment where the duration of a pulse is determined by a combination of a switching of the input of the flip-flop implementing the transition and of a switching of the output of this flip-flop enables to do away with a sizing of circuit C2 ascertaining that the switching times of signals CK1 to CK4 are slower than those of the flip-flops, for example to do away with a sizing ascertaining that each pulse of signals CK1 to CK4 has a width by 20% to 30% greater than the minimum duration that the flip-flops can withstand.

Figure 4:
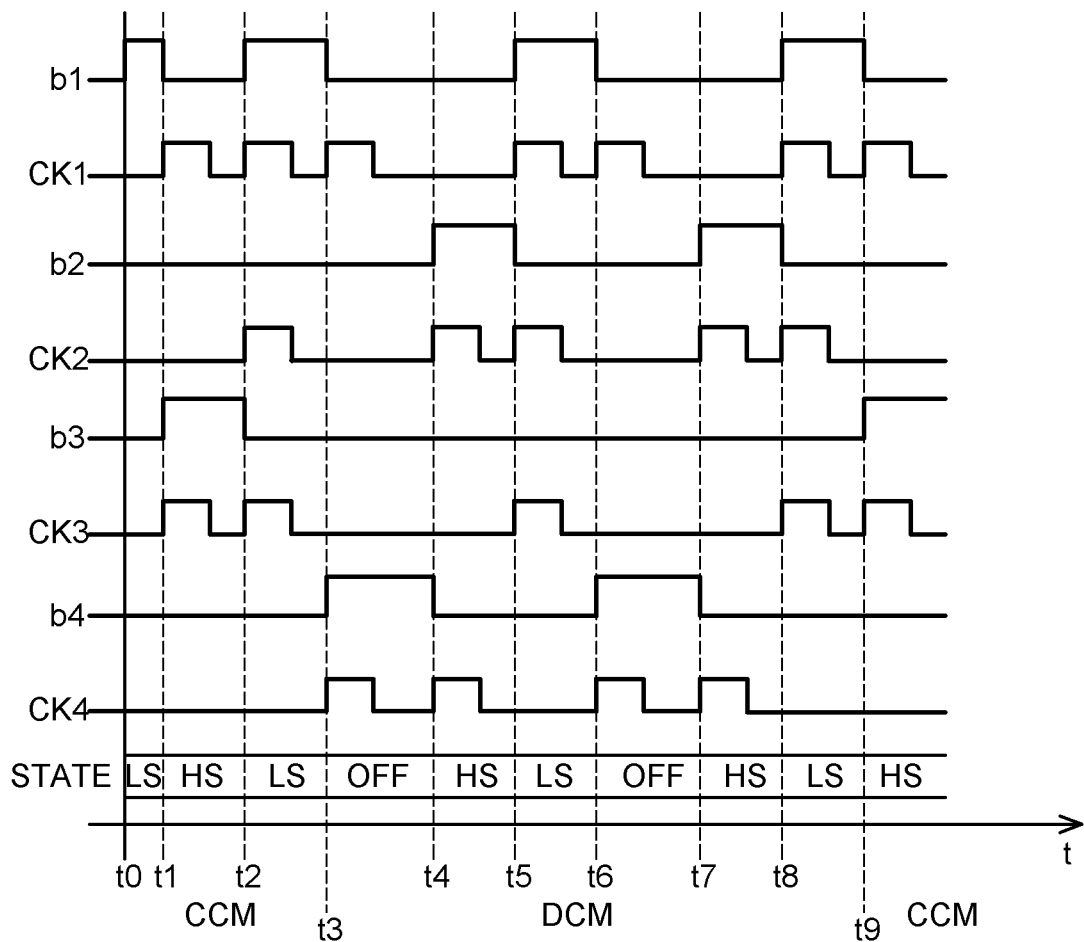
FIG. 4 illustrates, in timing diagrams, an example of an operating mode of the state machine of FIG. 3.

FIG. 4 illustrates, in timing diagrams, an example of an operating mode of the state machine, or circuit, aFSM of the example illustrated in FIG. 3. More particularly, FIG. 4 illustrates the variation according to time t of signals b1, CK1, b2, CK2, b4, CK3, b4, CK4 and of the current state (bearing reference STATE in FIG. 4).

In the illustrated example, each of bits b1 to b4 is active in the high state (or level), and inactive in the low state (or level) and, further, each pulse of each of signals CK1 to CK4 corresponds to a high state (or level) of this signal. However, those skilled in the art will be capable of adapting the following description to examples where at least one of bits b1 to b4 is active in a low level and/or at least one of signals CK1 to CK4 exhibits pulses corresponding to a low level of the signal.

Further, in the illustrated example, the pulses of signals CK1 to CK2 have a constant duration although in other examples not illustrated, each pulse has a duration determined by a switching of at least one of bits b1 to b4 as indicated in relation with FIG. 3.

At a time t0, circuit aFSM is in current state LS (bit b1 active).

At a next time t1, signal R3 (not illustrated in FIG. 4) indicates to circuit C2 that an implementation of transition LS2HS is required. Since none of signals CK1 to CK4 exhibits a pulse at time t1, circuit C2 generates a pulse of signal CK3, and, simultaneously, a pulse of signal CK1.

As a result, bit b3 switches to the active state and bit b1 switches to the inactive state. In other words, the current state of circuit aFSM switches from state LS to state HS.

At time t1, circuit aFSM then controls the converter in continuous mode CCM.

At a next time t2, after the end of pulses CK1 and CK3 between times t1 and t2, signal R1 (not illustrated in FIG. 4) indicates to circuit C2 that an implementation of transition HS2LS is required. Since none of signals CK1 to CK4 exhibits a pulse at time t2, circuit C2 generates a pulse of signal CK1, and, simultaneously, a pulse of signal CK2 and a pulse of signal CK3.

As a result, bit b1 switches to the active state and bit b3 switches to the inactive state. In other words, the current state of circuit aFSM switches from state HS to state LS.

At a next time t3, after the end of pulses CK1, CK2, and CK3 between times t2 and t3, signal R4 (not illustrated in FIG. 4) indicates to circuit C2 that an implementation of transition LS2OFF is required. Since none of signals CK1 to CK4 exhibits a pulse at time t3, circuit C2 generates a pulse of signal CK4, and, simultaneously, a pulse of signal CK1.

As a result, bit b4 switches to the active state and bit b1 switches to the inactive state. In other words, the current state of circuit aFSM switches from state LS to state OFF.

From time t3, circuit aFSM thus controls the converter in discontinuous mode DCM.

At a next time t4, after the end of pulses CK1 and CK4 between times t3 and t4, signal R2 (not illustrated in FIG. 4) indicates to circuit C2 that an implementation of transition OFF2HS is required. Since none of signals CK1 to CK4 exhibits a pulse at time t4, circuit C2 generates a pulse of signal CK2, and, simultaneously, a pulse of signal CK4.

As a result, bit b2 switches to the active state and bit b4 switches to the inactive state. In other words, the current state of circuit aFSM switches from state OFF to state HS.

At a next time t5, after the end of pulses CK2 and CK4 between times t4 and t5, signal R1 (not illustrated in FIG. 4) indicates to circuit C2 that an implementation of transition HS2LS is required. Since none of signals CK1 to CK4 exhibits a pulse at time t5, circuit C2 generates a pulse of signal CK1, and, simultaneously, a pulse of signal CK2 and a pulse of signal CK3.

As a result, bit b1 switches to the active state and bit b2 switches to the inactive state. In other words, the current state of circuit aFSM switches from state HS to state LS.

What takes place at the next successive times t6, t7, and t8 is identical to what has been described for respective times t3, t4, and t5.

At a next time t9, after the end of pulses CK2 and CK4 between times t8 and t9, signal R3 (not illustrated in FIG. 4) indicates to circuit C2 that an implementation of transition LS2HS is required. Since none of signals CK1 to CK4 exhibits a pulse at time t9, circuit C2 generates a pulse of signal CK3, and, simultaneously, a pulse of signal CK1.

As a result, bit b3 switches to the active state and bit b1 switches to the inactive state. In other words, the current state of circuit aFSM switches from state LS to state HS.

From time t9, circuit aFSM thus controls the converter in continuous mode CCM.

Figure 5:
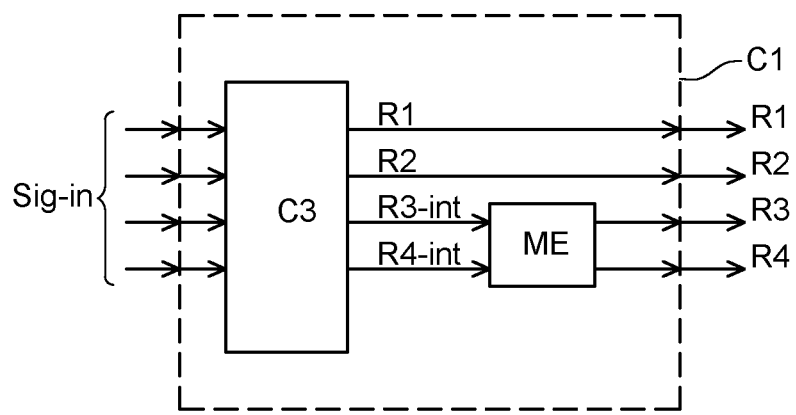
FIG. 5 shows, in the form of blocks, an example of detailed embodiment of a circuit of the state machine of FIG. 3.

FIG. 5 shows, in the form of blocks, an example of a detailed embodiment of the circuit C1 of the state machine aFSM of FIG. 3.

As previously indicated, circuit C1 further comprises a mutual exclusion circuit ME. Circuit ME is configured to supply the signal R3 indicating whether an implementation of transition LS2HS is required or not and the signal R4 indicating whether an implementation of transition LS2OFF is required or not, so that only one among signals R3 and R4 can indicate that an implementation of the transition corresponding thereto is required.

In the example of FIG. 5, circuit C1 comprises a combinational circuit C3. Circuit C3 receives the input signals sig-in of circuit C1. Circuit C3 is configured to supply signals R1 and R2, based on signals sig-in.

In the example of FIG. 5, circuit C3 is further configured to supply, based on signals sig-in, a signal R3-int internal to circuit C1, and a signal R4-int internal to circuit C1.

Signal R3-int indicates whether the conditions for the implementation of transition LS2HS are verified or not, without taking into account the fact that the conditions for the implementation of transition LS2OFF are or not verified. Similarly, signal R4-int indicates whether the conditions for the implementation of transition LS2OFF are verified or not, without taking into account the fact that the conditions for the implementation of transition LS2HS are or not verified.

Thus, signals R3-int and R4-int may indicate that the conditions of transitions LS2HS and LS2OFF are simultaneously verified. Circuit ME receives the two signals R3-int and R4-int and supplies the corresponding signals R3 and R4. In particular, when the two signals R3-int and R4-int simultaneously indicate that the conditions of transitions LS2HS and LS2OFF are verified, circuit ME supplies signals R3 and R4 so that only one of these signals indicates to circuit C2 that the transition corresponding to this signal is verified.

Figure 6:
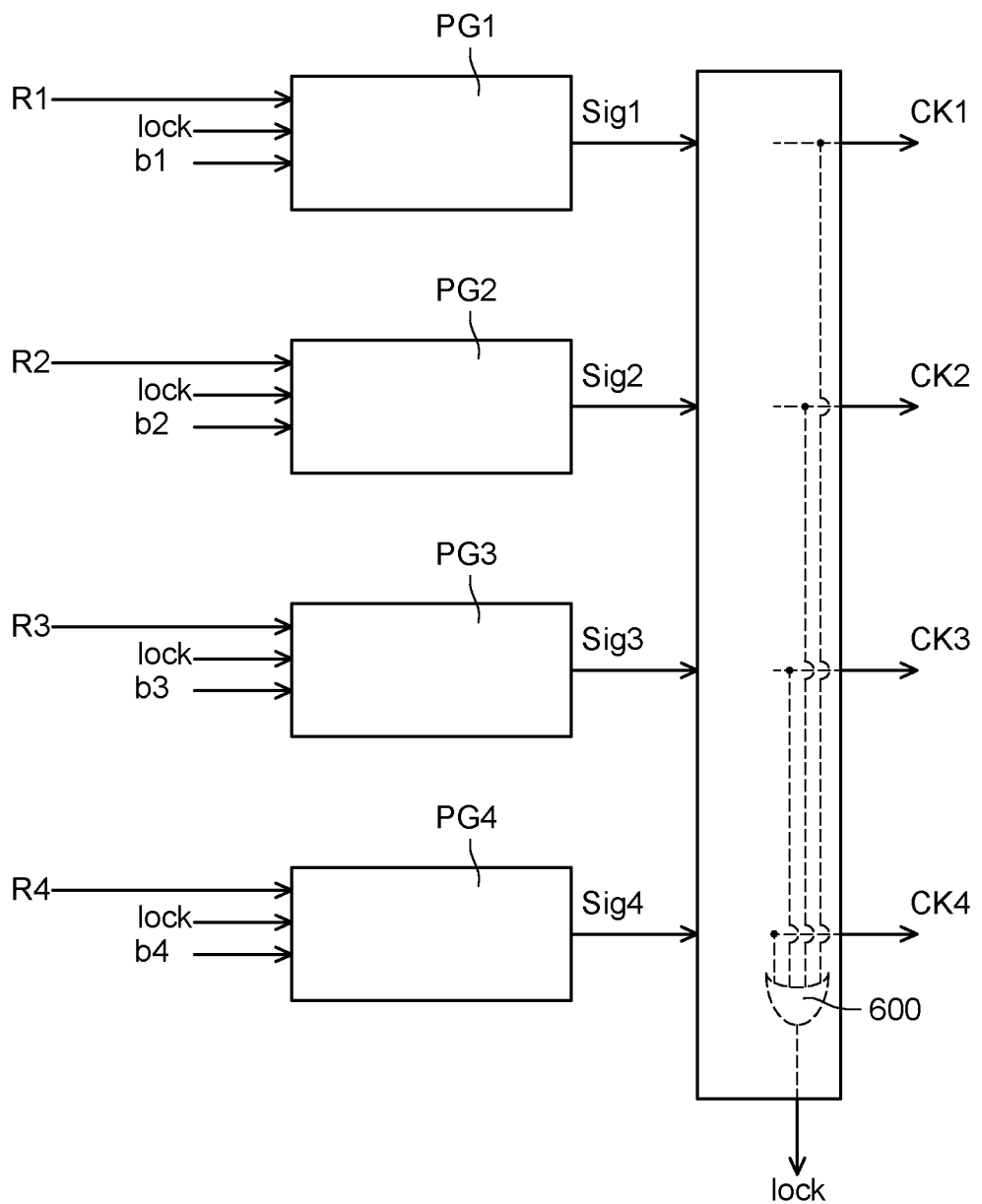
FIG. 6 shows, in the form of blocks, an example of detailed embodiment of another circuit of the state machine of FIG. 3.

FIG. 6 shows, in the form of blocks, an example of a detailed embodiment of the circuit C2 of the state machine aFSM of FIG. 3.

In the example of FIG. 6, circuit C2 comprises, for each transition of state machine aFSM, a pulse generator associated with this transition.

Thus, in the example of FIG. 6 where circuit C2 is that of the state machine aFSM described in relation with FIGS. 2 and 3, circuit C2 comprises a pulse generator PG1 associated with transition HS2LS (FIG. 2), a pulse generator PG2 associated with transition OFF2HS (FIG. 2), a pulse generator PG3 associated with transition LS2HS (FIG. 2), and a pulse generator PG4 associated with transition LS2OFF (FIG. 2).

Each pulse generator is configured to receive the signal R1, R2, R3, or R4 corresponding to the transition having this pulse generator associated therewith, that is, the signal R1, R2, R3, or R4 indicating whether an implementation of the transition having the pulse generator associated therewith is required or not.

In the example of FIG. 6 where circuit C2 is that of the state machine aFSM described in relation with FIGS. 2 and 3, pulse generator PG1 thus receives signal R1, pulse generator PG2 receives signal R2, pulse generator PG3 receives signal R3, and pulse generator PG4 receives signal R4.

Each generator PG1, PG2, PG3, PG4 is configured, each time the signal R1, R2, R3, R4 that it receives indicates that an implementation of the transition corresponding to this signal is required, that is, each time the generator receives a request of implementation of the transition with which it is associated, to generate an output pulse only if none of signals CK1 to CK4 exhibits a pulse.

More particularly, generators PG1, PG2, PG3, and PG4 are configured to supply a respective output signal sig1, sig2, sig3, and sig4, and the supply of an output pulse by the generator corresponds to the supply of a pulse of its output signal.

Circuit C2 comprises a combinational circuit C4. Circuit C4 is configured to supply signals CK1 to CK4 based on the output pulses sig1 to sig4 of generators PG1 to PG4. Thus, circuit C4 receives signals sig1 to sig4. The implementation of circuit C4 to obtain the previously-described operation is within the abilities of those skilled in the art, in particular as concerns the supply of signals CK1 to CK4 based on signals sig1 to sig4.

As an example not detailed in FIG. 6, in the case where each pulse of each of signals sig1 to sig4 and CK1 to CK4 corresponds to a high level of the signal, signal CK3 is generated by circuit C4 based on signals sig1 and sig3, and for example corresponds to the output signal of a logic OR gate taking at its input the two signals sig1 and sig3.

More generally, circuit C4 is, for example, configured so that, for each pulse generator PG1 to PG4, each pulse of the output signal of the generator results in a simultaneous pulse of identical duration of the signal CK1, CK2, CK3, or CK4 dedicated to the flip-flop implementing the transition associated with this pulse generator, and, further, in a simultaneous pulse of identical duration of the signal CK1, CK2, CK3, or CK4 dedicated to each flip-flop having its output supplying a bit to the input implementing the transition associated with this pulse generator.

In other words, the duration of each pulse of each signal CK1, CK2, CK3, CK4 is set by, or equal to, the duration of the pulse of the signal sig1, sig2, sig3, or sig4 which has caused it.

For example, when circuit C4 receives a pulse of signal sig1, it delivers a pulse for each of signals CK1, CK2, and CK3 which has the same duration as the pulse of signal sig1.

According to an embodiment, in order for each pulse generator PG1 to PG4 to generate no pulse of its output signal if at least one of signals CK1 to CK4 already exhibits a pulse, circuit C4 is further configured to supply a binary signal lock indicating whether or not at least one of signals CK1 to CK4 exhibits a pulse. More particularly, signal lock is in a first binary state, or level, if at least one of signals CK1 to CK4 exhibits a pulse, and in a second binary state, or level, otherwise. Each pulse generator PG1, PG2, PG3, PG4 is then configured, when the signal R1, R2, R3, R4 that it receives indicates thereto a request of implementation of the corresponding transition, to deliver a pulse of its output signal sig1, sig2, sig3, sig4 only if signal lock is at its first level. Thus, each pulse generator PG1, PG2, PG3, PG4 receives signal lock.

As an example illustrated in dotted lines in FIG. 6, in the case where each pulse of each of signals CK1 to CK4 corresponds to a high level of the signal, signal lock is, for example, the output signal of an OR gate 600 taking as inputs signals CK1 to CK4, the first level of signal lock then being the high level of the signal.

In an embodiment where, for each transition, the duration of the pulses of signals CK1 to CK4, and thus of signals sig1 to sig4, generated to implement the transition is determined, or controlled, by a switching of the output of the flip-flop implementing the transition, each pulse generator PG1 to PG4 is configured, at each pulse of its output signal, so that a switching of the output bit of the flip-flop implementing the transition with which this generator is associated ends this pulse of its output signal. For example, each pulse generator PG1, PG2, PG3, PG4 comprises an input configured to control the setting back to an idle state of its output signal sig1, sig2, sig3, or sig4, that is, to force the end of the pulse of its output signal. This input of the pulse generator then receives a signal representative of the output bit of the flip-flop of the transition associated with the generator, for example directly the output bit of this flip-flop as illustrated in FIG. 6 where pulse generators PG1, PG2, PG3, and PG4 receive respective bits b1, b2, b3, and b4.

In an alternative embodiment (not illustrated), for each transition, the duration of the pulses of signals CK1 to CK4, and thus of signals sig1 to sig4, generated to implement the transition is determined, or controlled, by a switching of the D input of the flip-flop implementing the transition. In this case, each pulse generator PG1 to PG4 is configured, at each pulse of its output signal, so that a switching of the input bit of the flip-flop implementing the transition with which this generator is associated ends this pulse of its output signal. For example, each pulse generator PG1, PG2, PG3, PG4 comprises an input configured to control the setting back to an idle state of its output signal sig1, sig2, sig3, or sig4, that is, to force the end of the pulse of its output signal. This input of the pulse generator then receives a signal representative of the input bit of the flip-flop of the transition associated with the generator, for example directly the input bit of this flip-flop. For example, in such an embodiment, pulse generator PG4 receives the input bit b1 of the flip-flop FF-LS2OFF associated with generator PG4.

In another alternative embodiment (not illustrated), for each transition, the duration of the pulses of signals CK1 to CK4, and thus of signals sig1 to sig4, generated to implement the transition is determined, or controlled, by a combination of a switching of the D input of the flip-flop implementing the transition and of a switching of the output of the flip-flop implementing the transition. In this case, each pulse generator PG1 to PG4 is configured, at each pulse of its output signal, so that a combination of a switching of the D input of the flip-flop implementing the transition associated with the generator and of a switching of the output of the flip-flop implementing the transition associated with the generator ends this pulse of its output signal. For example, each pulse generator PG1, PG2, PG3, PG4 comprises an input configured to control the setting back to an idle state of its output signal sig1, sig2, sig3, or sig4, that is, to force the end of the pulse of its output signal. This input of the pulse generator then receives a signal representative of a combination of the input bit and of the output bit of the flip-flop of the transition associated with the generator, for example directly the output bit of a logic gate taking as an input the complement of the input bit of the flip-flop and the output bit when these bits are active in the high level. For example, in such an embodiment, pulse generator PG4 receives a bit in a first state if bit b1 is inactive and bit b4 is active, and in a second state otherwise.

In still another embodiment, the duration of the output pulses of generators PG1 to PG4 is fixed.

According to an embodiment, there is provided a switching converter similar or identical to that of FIG. 1, where state machine FSM is implemented by the state machine, or circuit, aFSM provided herein and described hereabove in relation with the specific examples of FIGS. 2 to 6.

Various embodiments and variants have been described. Those skilled in the art will understand that certain features of these various embodiments and variants may be combined, and other variants will occur to those skilled in the art. In particular, those skilled in the art will be capable, based on the above description of specific examples of embodiment, of providing finite state machines aFSM for controlling a converter which comprise other transitions between states OFF, HS, and LS than those described. Further, those skilled in the art will be capable of adapting the described examples when the pulses of at least one of the described signals each correspond to a low level of the signal rather than to a high level, and/or when at least one of the output bits of the flip-flops implementing the transitions is active when it is at its low level (or state).

Finally, the practical implementation of the described embodiments and variants is within the abilities of those skilled in the art based on the functional indications given hereabove.

The invention claimed is:

1. An asynchronous finite state machine for controlling high-side and low-side switches of a switching converter, wherein the asynchronus finite state machine comprises a plurality of states connected together by transitions, comprising:
   a flip-flop implementing each transition, wherein each flip-flop has an output configured to supply a bit representative of a state of the asynchronous finite state machine, said state being a state of arrival of the transition implemented by the flip-flop, a data input configured to receive a bit representative of an initial state of the transition implemented by the flip-flop, and a control input configured to receive a first binary signal dedicated to said flip-flop;
   a first combinational circuit is configured to supply, based on input signals of the asynchronous finite state machine and on the bits supplied by the outputs of the flip-flops, and for each transition, a second binary signal corresponding to said transition and indicating whether an implementation of said transition is required or not; and
   a second circuit is configured to generate based on the second binary signals, at each request of implementation of a transition and in the absence of a pulse of the first binary signals, a pulse of the first binary signal dedicated to the flip-flop implementing said transition, and a pulse of the first binary signal dedicated to each flip-flop having its output configured to supply a bit to the data input of the flip-flop implementing said transition.

2. The asynchronous finite state machine according to claim 1, wherein each flip-flop is configured so that a beginning of each pulse of the first binary signal dedicated to said flip-flop causes an update of said flip-flop.

3. The asynchronous finite state machine according to claim 1, wherein the second circuit is configured to generate, at each request of implementation of a transition and in the absence of a pulse of the first binary signals, only the pulse of the first binary signal dedicated to the flip-flop implementing said transition and the pulse of the first binary signal dedicated to each flip-flop having its output configured to supply a bit to the data input of the flip-flop implementing said transition.

4. The asynchronous finite state machine according to claim 1, wherein the first combinational circuit comprises no state register and no circuit for storing the input signals of the asynchronous finite state machine.

5. The asynchronous finite state machine according to claim 1, wherein the asynchronous finite state machine comprises:
   at least one pair of transitions having a same initial state; and
   for each pair of transitions having the same initial state, the first combinational circuit comprises a mutual exclusion circuit configured, based on the plurality of said input signals of the asynchronous finite state machine, to supply the second binary signal indicating whether an implementation of a first transition of the pair of transitions is required or not and the second binary signal indicating whether an implementation of a second transition of the pair of transitions is required or not, so that only one of the second binary signals indicates that the transition corresponding to this second binary signal is required.

6. The asynchronous finite state machine according to claim 1, wherein the second circuit comprises:
   for each transition, a pulse generator associated with said transition and configured to:
      receive the second binary signal corresponding to said transition; and
      generate, at each request of implementation of said transition and in the absence of a pulse of the first binary signals, an output pulse; and
   a third combinational circuit configured to supply said first binary signals based on the output pulses of the pulse generators.

7. The asynchronous finite state machine according to claim 6, wherein the third combinational circuit is further configured to deliver a lock binary signal at a first level only if at least one of the first binary signals exhibits a pulse and at a second level otherwise, each pulse generator being configured to deliver no output pulse if said lock binary signal is at the first level.

8. The asynchronous finite state machine according to claim 6, wherein each pulse generator is configured, at each output pulse delivered by the pulse generator, so that a switching of the output of the flip-flop implementing the transition with which the generator is associated ends said output pulse.

9. The asynchronous finite state machine according to claim 6, wherein each pulse generator is configured, at each output pulse delivered by the pulse generator, so that a switching of the data input of the flip-flop implementing the transition with which the generator is associated ends said output pulse.

10. The asynchronous finite state machine according to claim 1, wherein the second circuit is configured so that each pulse of the first binary signals has a same constant duration determined by a hold time of said flip-flops.

11. The asynchronous finite state machine according to claim 10, wherein the second circuit is configured so that, at each request of implementation of a transition for which the second circuit generates a pulse of the first binary signal dedicated to the flip-flop implementing the transition and a pulse of the first binary signal dedicated to each flip-flop having its output configured to supply a bit to the data input of the flip-flop implementing said transition, a switching of the output of the flip-flop implementing the transition ends said pulses.

12. The asynchronous finite state machine according to claim 1, wherein the second circuit is configured so that, at each request of implementation of a transition for which the second circuit generates a pulse of the first binary signal dedicated to the flip-flop implementing the transition and a pulse of the first binary signal dedicated to each flip-flop having its output configured to supply a bit to the data input of the flip-flop implementing said transition, a switching of the data input of the flip-flop implementing the transition ends said pulses.

13. The asynchronous finite state machine according to claim 1, wherein the asynchronous finite state machine is configured to implement:
a first phase controlling a high-side switch of a switching converter to the on state and a low-side switch of the converter to the off state;
a second phase controlling the low-side switch to the on state, respectively controlling the high-side switch to the off state; and
a third phase controlling both switches to the off state,
and wherein, for each state, the asynchronous finite state machine is configured to implement one of said first, second, and third phases.

14. The asynchronous finite state machine according to claim 13, wherein the asynchronous finite state machine is configured to control the converter alternatively in continuous conduction mode and in discontinuous conduction mode, the continuous conduction mode comprising one or a plurality of implementations of a succession of the second, third, and first phases, and the continuous conduction mode comprising one or a plurality of implementations of a succession of the second and first phases.

15. The asynchronous finite state machine according to claim 13, wherein the flip-flops comprise exactly a first flip-flop, a second flip-flop, a third flip-flop, and a fourth flip-flop configured so that:
a data input of the first flip-flop receives a bit supplied by an output of the second flip-flop and a bit supplied by an output of the third flip-flop;
data inputs of the third and fourth flip-flops each receive a bit supplied by an output of the first flip-flop; and
a data input of the second flip-flop receives a bit supplied by an output of the fourth flip-flop.

16. The asynchronous finite state machine according to claim 15, wherein:
the bit supplied by the output of the second flip-flop and the bit supplied by the output of the third flip-flop are representative of a first state of the asynchronous finite state machine;
the bit supplied by the output of the first flip-flop is representative of a second state of the asynchronous finite state machine;
the bit supplied by the output of the fourth flip-flop is representative of a third state of the asynchronous finite state machine; and
the asynchronous finite state machine is configured to implement the first, second, and third phase in the first, second, and third states respectively.

17. A switching converter, comprising:
a high-side switch coupling a connection node to a node configured to receive a power supply potential;
a low-side switch coupling the connection node to a node configured to receive a reference potential;
an inductor coupling the connection node to an output of the converter; and
the asynchronous finite state machine according to claim 1 for controlling the high-side and low-side switches of the switching converter.

18. An asynchronous finite state machine having a plurality of states connected together by transitions, comprising:
a flip-flop for each transition, wherein an output of each flip-flop supplies a bit representative of an arrival state of the asynchronous finite state machine, wherein a data input receives a bit representative of an initial state of the transition, and a control input receives a first binary signal dedicated to said flip-flop;
a first combinational circuit configured to process input signals of the asynchronous finite state machine and the bits at the outputs of the flip-flops to generate, for each transition, a second binary signal indicating an implementation of said transition; and
a second circuit is configured to process the second binary signals and, for each implementation of a transition, generate a pulse of the first binary signal dedicated to the flip-flop implementing said transition and generate a pulse of the first binary signal dedicated to each flip-flop whose output supplies a bit to the data input of said flip-flop implementing said transition.

19. The asynchronous finite state machine according to claim 18, wherein when at least one pair of transitions have a same initial state the first combinational circuit comprises a mutual exclusion circuit configured to supply the second binary signal controlling only one flip flop associated with said pair of transitions is provided for indicating implementation of the transition.

20. The asynchronous finite state machine according to claim 18, wherein the second circuit comprises:
for each transition, a pulse generator associated with said transition and configured to:
receive the second binary signal corresponding to said transition; and
generate an output pulse at each request of implementation of said transition; and
a third combinational circuit configured to supply said first binary signals based on the output pulses of the pulse generators.

21. The asynchronous finite state machine according to claim 18, wherein the second circuit is configured so that each pulse of the first binary signals has a same constant duration determined by a hold time of said flip-flops.

22. A switching circuit, comprising:
a plurality of transistor switches; and
the asynchronous finite state machine according to claim 18, wherein the asynchronous finite state machine is configured to control the plurality of transistor switches.

* * * * *